United States Patent
Luo et al.

(10) Patent No.: US 7,826,749 B2
(45) Date of Patent: Nov. 2, 2010

(54) METHOD AND SYSTEM FOR QUANTUM KEY DISTRIBUTION OVER MULTI-USER WDM NETWORK WITH WAVELENGTH ROUTING

(75) Inventors: Yuhui Luo, Sichuan (CN); Kam Tai Chan, Hong Kong (CN)

(73) Assignee: The Chinese University of Hong Kong, Hong Kong (HK)

( * ) Notice: Subject to any disclaimer, the term of this patent is extended or adjusted under 35 U.S.C. 154(b) by 1078 days.

(21) Appl. No.: 11/231,042

(22) Filed: Sep. 19, 2005

(65) Prior Publication Data
US 2007/0065154 A1   Mar. 22, 2007

(51) Int. Cl.
H04J 14/02 (2006.01)
H04B 10/00 (2006.01)
H04K 1/00 (2006.01)
H04L 9/08 (2006.01)
H04L 9/32 (2006.01)

(52) U.S. Cl. .................. 398/89; 398/78; 398/151; 380/256; 380/278; 713/171

(58) Field of Classification Search .................. 398/78, 398/89, 151; 380/256, 278; 713/171
See application file for complete search history.

(56) References Cited

U.S. PATENT DOCUMENTS

| 5,515,438 | A | 5/1996 | Bennett et al. |
| 7,113,598 | B2 * | 9/2006 | Flusberg et al. ............. 380/256 |
| 7,130,045 | B2 | 10/2006 | Popov |
| 2005/0100351 | A1 * | 5/2005 | Yuan et al. .................. 398/214 |
| 2005/0135627 | A1 | 6/2005 | Zavriyev et al. |
| 2005/0180575 | A1 | 8/2005 | Maeda et al. |
| 2006/0018475 | A1 | 1/2006 | Vig et al. |
| 2006/0045527 | A1 | 3/2006 | Maeda et al. |
| 2006/0187537 | A1 * | 8/2006 | Huber et al. ........... 359/337.22 |
| 2006/0210083 | A1 * | 9/2006 | Takemoto et al. ........... 380/278 |
| 2006/0263096 | A1 * | 11/2006 | Dinu et al. .................. 398/187 |

FOREIGN PATENT DOCUMENTS

CN   1614918   5/2005

OTHER PUBLICATIONS

Silva et al., "A Dense WDM Source Using Optical Frequency Comb Generation and Widely Tunable Injection-Locked Laser Filtering Techniques," IEE PREP 2000 Conference on Postgraduate Research in Electronics, Photonics and Related Fields, pp. 497-500, Nottingham, UK, Apr. 2000.*

(Continued)

Primary Examiner—Nathan M Curs
(74) Attorney, Agent, or Firm—Schwegman, Lundberg & Woessner, P.A.

(57) ABSTRACT

A system and a method for quantum key distribution over a multi-user wavelength division multiplexing (WDM) network are disclosed. The system comprises a tunable or multi-wavelength transmitter; a plurality of receivers, each assigned a receiving-wavelength; and a multi-user WDM network linking the transmitter to the receivers. The transmitter can select a receiver among the receivers to be communicated therewith and transmit quantum signals to the selected receiver over the WDM network. The quantum signals are at a wavelength equal to a receiving-wavelength of the receiver. Therefore the WDM network allows quantum signals to be communicated between the transmitter and the receivers by wavelength routing.

20 Claims, 4 Drawing Sheets

OTHER PUBLICATIONS

Nweke et al., Experimental Characterization of Wavelength Separation for "QKD+WDM" Co-Existence; Lasers and Electro-Optics, 2005 (CLEO), Conference on; vol. 2, May 22-27, 2005, pp. 1503-1505.*

International Search Report dated Nov. 23, 2006 issued for corresponding International Patent Application No. PCT/CN2006/001815.

Chapuran et al., "Compatibility of Quantum Key Distribution with Optical Networking," Proc. SPIE, 5815:164-175, Mar. 29, 2005.

Miller et al., "Optical Fiber Bandpasses," Optical Communications Rules of Thumb, New York, McGraw-Hill, p. 235-236, 2002.

* cited by examiner

METHOD AND SYSTEM FOR QUANTUM KEY DISTRIBUTION OVER MULTI-USER WDM NETWORK WITH WAVELENGTH ROUTING

FIELD OF THE INVENTION

The present invention relates to a system for communicating encrypted data. In particular, the present invention relates to the technique known as quantum key distribution over multi-user wavelength division multiplexing (WDM) network with wavelength routing.

TECHNICAL BACKGROUND OF THE INVENTION

Quantum cryptography is believed to be a natural candidate to enhance conventional cryptographies because it can provide ultimate security by the laws of quantum theory. Most of research in this field is centered on point-to-point transmission between two users. At present, quantum cryptography has been successfully achieved in a point-to-point link in optical fiber and free space. However, there are limited achievements on quantum key distribution over network to date. There exist more problems for quantum key distribution over network than that over point-to-point transmission. In fact, it has been thought that it is a difficult problem to distribute quantum keys over network.

FIG. 1 shows a conventional configuration of quantum key distribution over a star network, which exploits four phase shifts of weak pulse strings based on BB84 protocol at transmitter and receiver. In this setup, a transmitter (Tx) and receivers (Rx1-Rx3) use a phase modulator to encode and decode the phase shifts, and the transmitter launches a 3-photon pulse with a phase shift randomly chosen from four phases, (e.g. 0, $\pi/2$, $\pi$ and $3\pi/2$) into the fiber. The pulse is then equally split among the 3 receivers. For measurement, each receiver needs synchronization with the sent pulse. In addition, the setup cannot identify which user should receive the signal because all users in the depicted network can simultaneously receive signals from the sender even if she or he is not the intended receiver. That is to say, this system cannot establish a link just between two specific users to implement quantum key distribution.

SUMMARY OF THE INVENTION

Generally, the present invention provides a communication system for quantum key distribution, in which a transmitter can communicate over a conventional optical communications network with a plurality of receivers by using a different secret key sent at a different wavelength for each different receiver.

The present invention also provides a communication system for quantum key distribution with a relatively simple structure and high communication efficiency.

The present invention provides a method of quantum key distribution between a transmitter and a plurality of receivers over a multi-user wavelength division multiplexing (WDM) network with wavelength routing which comprises: 1) assigning a different receiving-wavelength to each of the receivers, respectively; 2) selecting a receiver among the receivers to be communicated with the transmitter; and 3) transmitting quantum key signals from the transmitter to the selected receiver over the WDM network, wherein the quantum key signals are at a wavelength identical to the receiving-wavelength of the receiver.

The present invention further provides a communication system for quantum key distribution comprising a transmitter; a plurality of receivers, each having a distinct receiving-wavelength; and a multi-user WDM network linking the transmitter to the receivers, wherein the transmitter selects a receiver among the receivers to be communicated therewith and transmits quantum signals to the selected receiver over the WDM network. The quantum signals transmitted are at a wavelength equal to the receiving-wavelength of the receiver.

According to an aspect of the present invention, a wavelength routing technology is employed to implement quantum key distribution for a plurality of receivers. The wavelength routing can be realized by a wavelength division demultiplexer, which may be in the form of an array waveguide grating (AWG). Moreover, the system can use all-fiber connections, which is suitable for optical fiber network.

According to another aspect of the present invention, continuous wave light is employed in the system, which can improve the security of the system. Moreover, differential phase detection is also employed in the present invention, in order to overcome the influence of a temperature shift and phase shift in the system, which can further make the system simple and stable. Furthermore, the present invention employs a randomly phase-modulated light of weak coherent states, e.g. two non-orthogonal states with phase shifts 0 and $\pi$, which can improve the communication efficiency of the system.

DETAILED DESCRIPTION OF THE INVENTION

The present invention will be described in detail with reference to the drawings.

Figure 1:
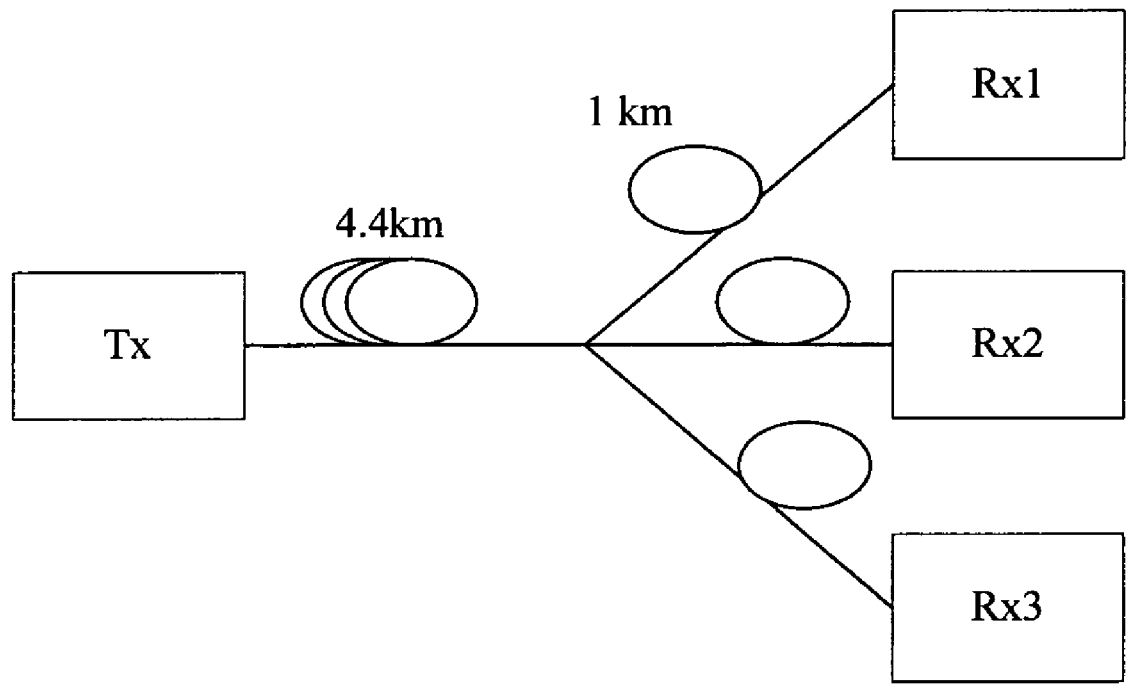
FIG. 1 is a schematic view showing the principle of quantum key distribution over star network in the prior art.
Figure 2:
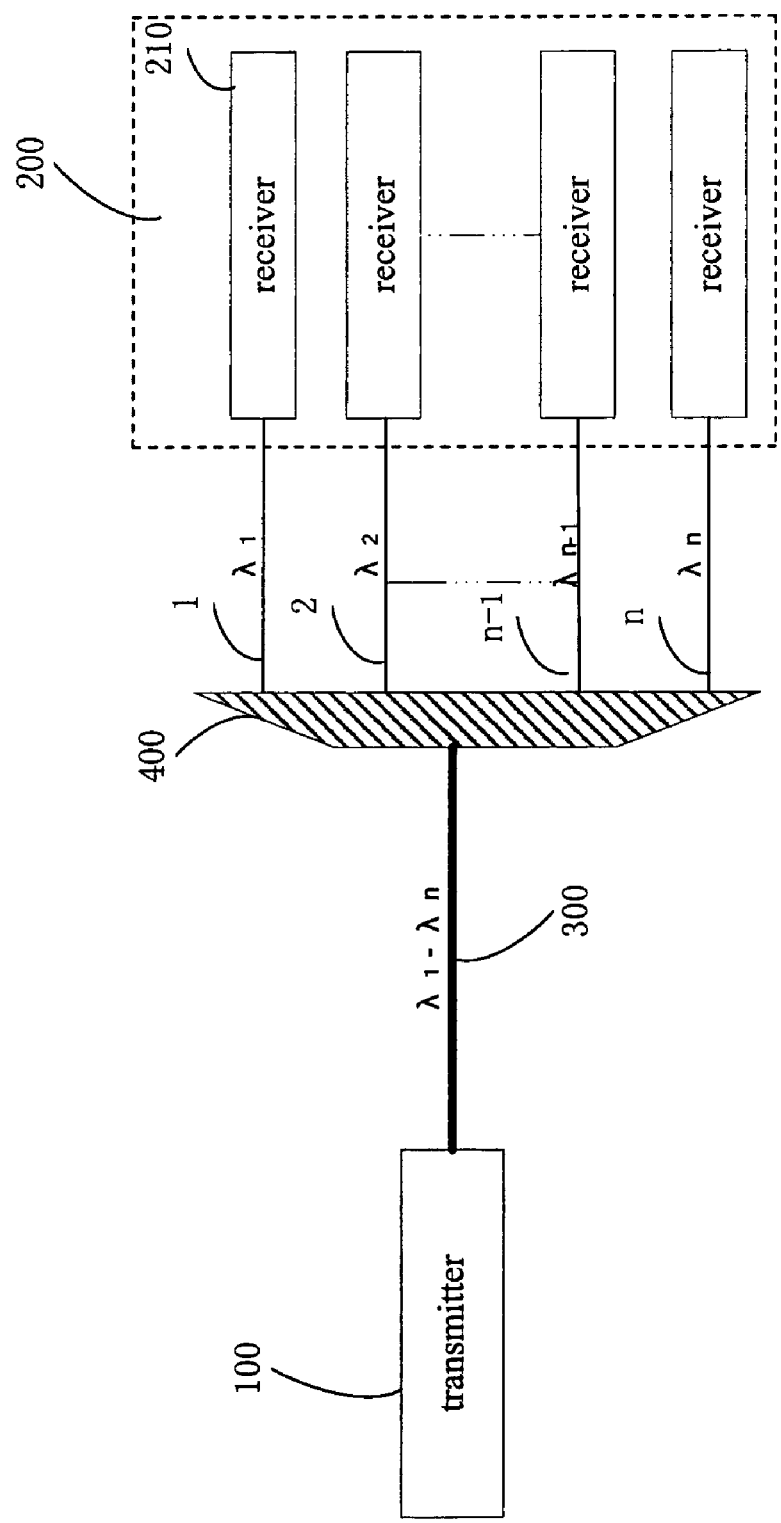
FIG. 2 is a schematic view showing principles of a wavelength routing technology employed in a communication system for quantum key distribution over a multi-user WDM network according to the present invention.

FIG. 2 shows an embodiment of the communication system for quantum key distribution over a multi-user WDM network according to the present invention. As shown in FIG. 2, the communication system comprises: a transmitter 100, a plurality of receivers 200 (8 receivers in this embodiment), each assigned a different receiving-wavelength (e.g. λ1-λn, where n=8), and an 8-user WDM network linking the transmitter 100 to the receivers 200.

Wavelength routing technology is used to implement quantum key distribution among specific users in the invention. In the embodiment, the wavelength routing can be realized by a wavelength division demultiplexer 400, such as an array waveguide grating (AWG). Therefore, the transmitter 100 can choose a wavelength to establish a channel (e.g. from channel 1 to channel n) with each receiver so that the transmitter 100 does not need to send signals to all the receivers. For example, if a receiver 210 having a receiving-wavelength, λ1, is selected to communicate with the transmitter 100, the transmitter will transmit quantum signals with a wavelength equal to λ.1. The signals, after passing through an optical fiber 300, reach the array waveguide grating 400, which can route the quantum signals to the receiver 210 only. In this manner, the transmitter 100 can communicate the quantum signals with only one selected receiver. By tuning the transmitter wavelength or selecting an appropriate wavelength of a multi-wavelength transmitter, one single transmitter can transmit quantum signals to each of the receivers 200 by using WDM technology. Receiving-wavelengths that can be assigned to each of the receivers in this embodiment are listed in Table 1.

TABLE 1

| Receivers | Receiving-Wavelength FWHM(nm) | Percentage of Used Gates | Arrival Counts ($s^{-1}$) |
| --- | --- | --- | --- |
| 1 | 1549.32 (0.018) | 8-9% | 558.305 |
| 2 | 1551.12 (0.016) | 7-8% | 477.7992 |
| 3 | 1552.4 (0.017) | 4-5% | 316.36 |
| 4 | 1554.145 (0.017) | 6-7% | 422.407 |
| 5 | 1555.689 (0.017) | 4-5% | 303.2212 |
| 6 | 1557.375 (0.017) | 3-4% | 245.2329 |
| 7 | 1558.996 (0.018) | 4-5% | 332.095 |
| 8 | 1560.615 (0.016) | 2-3% | 207.4174 |

Figure 3:
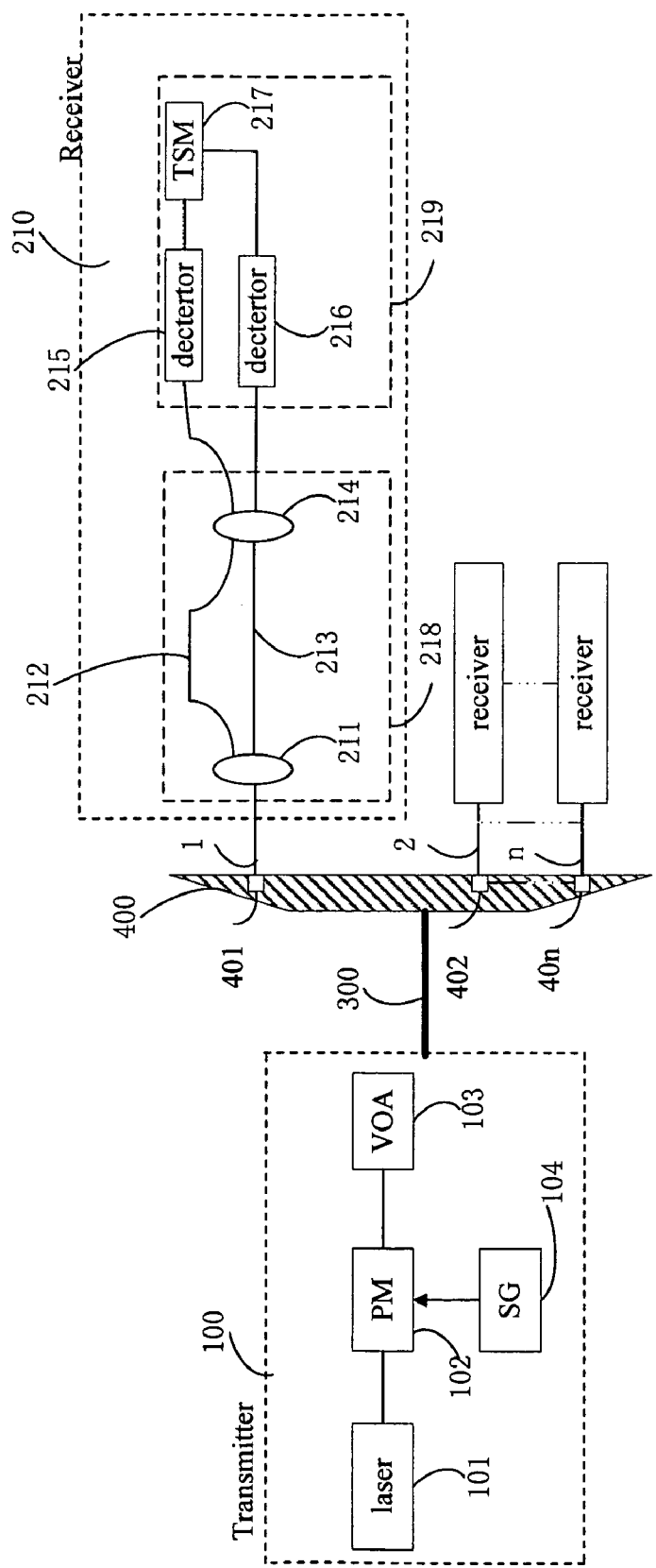
FIG. 3 is a schematic view of a communication system according to the present invention, which illustrates a structure of a channel between a transmitter and a receiver.

Now referring to FIG. 3, a configuration for transmitting quantum signals between a transmitter and an intended (selected) receiver over a multi-user WDM network according to the present invention is described.

As shown in FIG. 3, when a receiver 210 is selected to communicate with the transmitter 100, a tunable laser 101 at the transmitter 100 emits a continuous wave (CW) light whose wavelength corresponds to the receiving-wavelength of the receiver 210, into a phase modulator 102. A random phase shift of 0 or π generated by a random data signal generator 104 is added to the CW light. Then the CW light with a random phase shift is attenuated to single photons, with an average photon number less than one within a measured gate period, at the exit of a variable optical attenuator 103, which is coupled into a 8.5 km standard single mode optical fiber 300. After that, the attenuated light signal is sent to the AWG 400, to determine which user is selected via wavelength routing. The AWG 400 provides a plurality of output ports 401-40n, each having a distinct central wavelength and a bandwidth that corresponds to the receiving-wavelength of each of the receivers. And then, through the AWG 400, the attenuated signals arrive at the selected receiver 210 corresponding to the receiving-wavelength.

The receiver 210 provides an asymmetric Mach-Zehnder interferometer 218 to reconstruct a phase shift introduced by the transmitter 100. Preferably, the asymmetric Mach-Zehnder interferometer 218 comprises a first 50/50 beam splitter 211, a long arm 212, a short arm 213, and a second 50/50 beam splitter 214. The beam splitter 211 is employed for splitting the incoming signals into two portions respectively entering the long arm 212 and the short arm 213. The two split light signals are recombined by the beam splitter 214, in which the time difference between the two arms 212 and 213 is set equal to a time interval of a phase modulation period. That is, the random data signal generator 104 of the transmitter 100 can synchronize the phase modulator 102 to modulate the light with the time interval of the phase modulation period equal to the time difference experienced by the light while traveling across the two arms. With the Mach-Zehnder interferometer 218, an interference between the photons of the two arms occurs. The receiver 210 can detect single photons created by the constructively interfered signal by a single photon detector module 219 comprising two single photon detectors 215 and 216 respectively connected to two outputs of the beam splitter 214. The detector module works in gated mode with 2.5 ns and 100 KHz. The data can be stored in a computer via data capture software. Moreover a time slot measurement device 217 can be provided in the single photon detector module 219 for measuring the time slots at which a photon is detected at the detectors.

After raw key transmission, the receiver 210 tells the transmitter 100 the time slots measured. From this time message and the modulation state of the photons, the transmitter knows which detector clicked in the receiver. Under an agreement that the click by the detector 215 denotes "0" and the click by the detector 216 denotes "1", for example, the transmitter 100 and the receiver 210 will obtain an identical quantum key.

In this way, the transmitter 100 can choose a wavelength to establish a channel, channel 1, with the receiver 210 so that the transmitter 100 does not need to send the signal to the other receivers.

Moreover, since all the other receivers have the same configuration as the receiver 210, except that the receiver-wavelength thereof is different, the transmitter 100 can communicate with any of the single receivers in a similar way described above.

The efficiency of the single photon detector module 219 is greater than 10%, and thus the count rate should be less than 10 KHz in order to guarantee a single photon in a measured time slot. To achieve a better performance, the laser of the present invention is a narrow band laser source, so that the light emitted from the laser has a bandwidth narrower than the bandwidth of each of the output ports (from output port 401 to 40n) of the array waveguide grating. According to the embodiment of the present invention, the laser 101 can be tuned from 1,475 nm to 1,600 nm. The receiving-wavelengths used in the embodiment are listed in Table 1. Lastly, the single photon signals have been measured in each channel and crosstalks due to other channels are also detected. The count rate of the experiment is less than $1\times10^4$ counts/s, which corresponds to less than 0.1 count in a measured slot at the transmitter, in order to guarantee a single photon in the modulation time slot. After about 12 dB transmission loss, there are about 6% single photons to arrive at a receiver. The percentage of the used gates in the receivers 200 is shown in Table 1, and the count rates of single photons arriving at the receivers 200 from the transmitter 100 are also shown in Table 1. The error rte in each channel of the 8-user network is listed in Table 2.

TABLE 2

| | Channels | | | | | | | |
| --- | --- | --- | --- | --- | --- | --- | --- | --- |
| | 1 | 2 | 3 | 4 | 5 | 6 | 7 | 8 |
| Error Rates (%) | 1.93 | 2.15 | 2.75 | 3.19 | 2.76 | 2.73 | 2.24 | 6.26 |

This system can use all-fiber connections, which is suitable to optical fiber networks. The quantum key signal of the system is carried by the phase difference between two sequential phases.

An advantage to adopt differential phase detection is to overcome the influence of the temperature shift and phase shift in the system, which also makes the system simple. Another advantage is of high communication efficiency. In the previous schemes, at least two measurement bases are necessary when detection is done at receivers. In principle, there are only 50 percent of outcomes that are correct. Therefore, it will make a 3 dB loss, i.e. BB84 protocol has been used. However, one can use all of the measured outcomes in the present system.

Continuous wave light is employed in the system of the invention, which can improve the security of the system. Compared with a pulsed light, an eavesdropper, Eve, cannot measure the period of the phase modulation. Therefore, Eve cannot know the detailed information of the interferometer. In fact, single pulses will lead to leaking more information (interferometer structure parameter, which is very important to form quantum keys) to eavesdropper. If continuous light is adopted, then eavesdropper cannot know the difference between the two arms of the interferometer, which further improves the security of this system.

Compared with other automatic compensation schemes, the construct according to the invention has lower noise because there is no return signals (which can cause interference) in the current structure. That is also another advantage.

Figure 4:
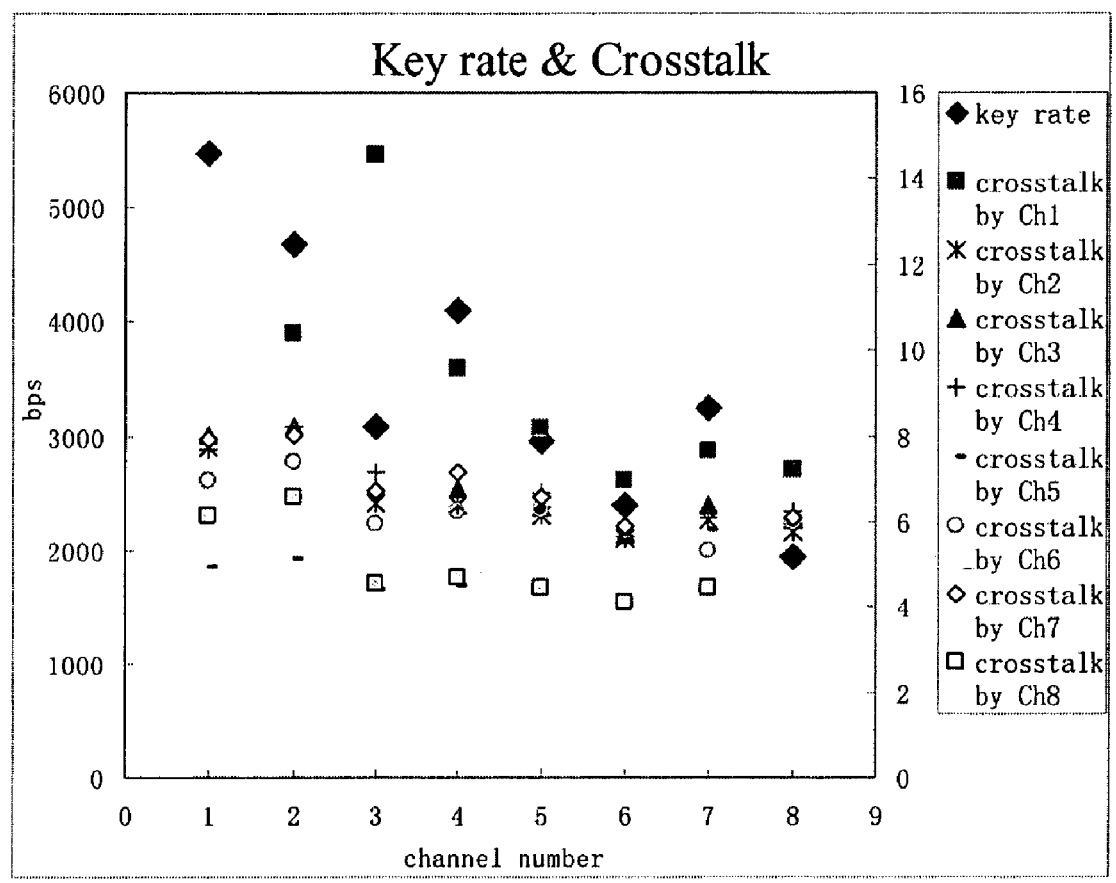
FIG. 4 shows an experimental result of the key rate and crosstalk of the communication between the transmitter and 8 different receivers over an 8-user WDM network according to the invention.

FIG. 4 shows that experimental key rates for the 8 channels vary from about 2 kb/s to more than 5 kb/s, which are shown in black diamond. Other dots in FIG. 4 show the crosstalks caused by the referred channels. The crosstalk due to channel 1 is the largest because of its highest single photon rate. For security, there is an upper bound for the loss in the system, which includes fiber transmission loss, component insertion loss, loss from wavelength routing and some loss caused by imperfect alignment. The total loss of about 12 dB is much less than the secure upper bound of 31 dB for the mean photon number per bit of 0.1. The crosstalk is mainly caused by the wavelength demultiplexing device, AWG, and laser source. Form FIG. 4, it is obvious that quantum key distribution in the present architecture is feasible because the cont rates caused by crosstalk and dark counts are very small compared to single photon signal counts.

Therefore, quantum key distribution over multi-user network using wavelength routing is achieved experimentally, which overcomes the broadcasting problem of the tree network. Furthermore, a differential phase modulation is applied to continuous wave light, which can eliminate the variations caused by temperature and polarization fluctuations in the system. Moreover, the higher key generation efficiency with a simple configuration demonstrated in this disclosure is suitable to practical applications.

Although, for ease of illustration, only 8 receivers are described in the embodiments, it would be obvious to those skilled in the art that smaller or greater numbers of the receivers may be employed in practice networks. The number chosen can be varied according to the field of use.

It is appreciated that the scope of the invention should be defined by the appended claims and not be restricted by the description discussed in the summary and/or the detailed description of the preferred embodiments.

The invention claimed is:

1. A method of quantum key distribution between a transmitter and a plurality of receivers over a wavelength division multiplexing (WDM) network, comprising:
    assigning a different receiving-wavelength to each of the plurality of receivers, respectively;
    selecting a receiver from the receivers to be communicated with the transmitter, wherein each of the plurality of receivers comprises an interferometer; and
    transmitting quantum signals from the transmitter to the selected receiver over the WDM network, wherein the transmitted quantum signals are at a wavelength equal to the receiving-wavelength of the receiver, and wherein transmitting quantum signals from the transmitter to the selected receiver over the WDM network comprises:
        emitting a light from a source of the transmitter, wherein the light emitted from the source is a continuous-wave light;
        randomly phase-modulating the continuous-wave light with at least two non-orthogonal states at a phase modulation period;
        attenuating the phase-modulated continuous-wave light such that an average photon number of the light less than one is detected within a time slot by a single photon detector; and
        transmitting the attenuated light through an optical fiber, wherein the optical fiber is optically coupled to the interferometer of the selected receiver via a wavelength division demultiplexer.

2. The method according to claim 1, further comprising:
    measuring a time slot at which a photon is detected at the receiver, wherein the receiver comprises at least two detectors;
    transmitting a time slot message from the receiver to the transmitter, wherein the time slot message identifies that a given detector of the at least two detectors received the photon; and
    determining the quantum keys by analyzing the time slot message at the transmitter.

3. A communication system for quantum key distribution comprising:
    a transmitter comprising:
        a source configured for emitting a continuous-wave light,
        a phase modulator configured for randomly phase-modulating the continuous-wave light within a phase modulation period, and
        a variable optical attenuator configured for attenuating the modulated continuous-wave light such that an average photon number less than one is detected within a time slot by a single photon detector, wherein the variable optical attenuator is located after the phase modulator;
    a plurality of receivers, each including an interferometer; and
    a wavelength division multiplexing (WDM) network configured for linking the transmitter to the receivers, wherein the WDM network comprises a wavelength division demultiplexer, wherein the transmitter is configured to select a receiver from the plurality of receivers and to transmit quantum signals to the interferometer in the selected receiver via the wavelength division demultiplexer, and wherein the quantum signals are wavelength equal to the receiving-wavelength of the selected receiver.

4. The communication system according to claim 3, wherein the source comprises a tunable laser ranging from 1,475 nm to 1,600 nm.

5. The communication system according to claim 3, wherein the phase modulator is configured for phase modulating the light with two non-orthogonal states.

6. The communication system according to claim 3, wherein the WDM network further comprises an optical fiber; and
    wherein the wavelength division demultiplexer comprises a plurality of output ports, each having a distinct central wavelength and a bandwidth that corresponds to the receiving-wavelength of each of the receivers.

7. The communication system according to claim 3, wherein the wavelength division demultiplexer comprises an array waveguide grating.

8. The communication system according to claim 6, wherein the source comprises a narrow band laser source, so that the light emitted from the source has a bandwidth narrower than that of each output port of the wavelength division demultiplexer.

9. The communication system according to claim 6, wherein the optical fiber comprises a standard single mode optical fiber.

10. The communication system according to claim 6, wherein the interferometer of each of the receivers comprises:
- an asymmetric Mach-Zehnder interferometer configured for quantum signal detection, having two arms of different time delays configured to generate an interference between signals from the two arms; and
- a single photon detector module configured for detecting a photon when a constructive interference occurs.

11. The communication system according to claim 10, wherein the asymmetric Mach-Zehnder interferometer comprises:
- a first beam splitter configured for splitting the light into two portions by the two arms, a time difference between the two arms being equal to a time interval of the phase modulation period; and
- a second beam splitter configured for combining the two portions after passing through the two arms so that the two portions interfere with each other.

12. The communication system according to claim 10, wherein the single photon detector module comprises two detectors for detecting the photon, wherein a click of a photon by one detector denotes "0" and that by the other detector denotes "1", and a time slot measurement device configured for measuring the time slot at which a photon is detected at the receiver.

13. The communication system according to claim 10, wherein the system is configured to use all-fiber connections.

14. The communication system according to claim 11, wherein the transmitter further comprises a random data signal generator configured for adding a random phase shift to the phase modulator and configured for synchronizing the phase modulator to modulate the light with the time interval of the phase modulation period equal to the time difference between the two arms in the asymmetric Mach-Zehnder interferometer in each of the receivers.

15. The method of claim 1, wherein the wavelength division demultiplexer comprises a plurality of output ports, each having a distinct central wavelength and a bandwidth that corresponds to the receiving-wavelength of each of the receivers.

16. The method according to claim 15, wherein the wavelength division demultiplexer comprises an array waveguide grating.

17. The method according to claim 15, wherein the source comprises a narrow band laser source configured to emit light with a bandwidth narrower than that of each of the plurality of output ports of the wavelength division demultiplexer.

18. The method of claim 1, further comprising:
- splitting light received by the selected receiver into two portions by at least a long arm of the interferometer and a short arm of the interferometer, in which a difference of time that light travels within between the long arm and the short time arm is equal to a time interval of the phase modulation period; and
- combining the two portions of the light after passing through the two arms, so that an interference occurs.

19. The method of claim 18, further comprising detecting a photon by two detectors when the interference is a constructive interference.

20. The method of claim 19, further comprising establishing quantum keys at the receiver based on which detector of the two detectors detects the photon.

* * * * *